(12) United States Patent
Marinier et al.

(10) Patent No.: US 8,824,419 B2
(45) Date of Patent: Sep. 2, 2014

(54) EFFICIENT UPLINK OPERATION WITH HIGH INSTANTANEOUS DATA RATES

(75) Inventors: Paul Marinier, Brossard (CA);
Alexander Reznik, Titusville, NJ (US);
Stephen E. Terry, Northport, NY (US)

(73) Assignee: Interdigital Technology Corporation, Wilmington, DE (US)

( * ) Notice: Subject to any disclaimer, the term of this patent is extended or adjusted under 35 U.S.C. 154(b) by 1445 days.

(21) Appl. No.: 11/966,596

(22) Filed: Dec. 28, 2007

(65) Prior Publication Data

US 2008/0165742 A1 Jul. 10, 2008

Related U.S. Application Data

(60) Provisional application No. 60/882,378, filed on Dec. 28, 2006.

(51) Int. Cl.
*H04W 4/00* (2009.01)

(52) U.S. Cl.
USPC .......................................................... 370/332

(58) Field of Classification Search
USPC .......................................................... 370/332
See application file for complete search history.

(56) References Cited

U.S. PATENT DOCUMENTS

| | | | |
|---|---|---|---|
| 7,142,548 B2 * | 11/2006 | Fong et al. | 370/395.4 |
| 7,239,870 B2 * | 7/2007 | Zhang et al. | 455/422.1 |
| 7,315,527 B2 * | 1/2008 | Wei et al. | 370/328 |
| 7,447,504 B2 * | 11/2008 | Lohr et al. | 455/450 |
| 7,480,269 B2 * | 1/2009 | Heo et al. | 370/328 |
| 7,603,382 B2 * | 10/2009 | Halt, Jr. | 1/1 |
| 7,680,094 B2 * | 3/2010 | Liu | 370/350 |
| 7,697,483 B2 * | 4/2010 | Usuda et al. | 370/331 |
| 7,701,901 B2 * | 4/2010 | Anderson et al. | 370/329 |
| 7,710,938 B2 * | 5/2010 | Choi et al. | 370/342 |
| 7,729,715 B2 * | 6/2010 | Love et al. | 455/522 |
| 7,733,846 B2 * | 6/2010 | Liu | 370/352 |
| 7,821,992 B2 * | 10/2010 | Chun et al. | 370/329 |
| 7,839,892 B2 * | 11/2010 | Eckert et al. | 370/469 |
| 7,853,205 B2 * | 12/2010 | Papasakellariou | 455/23 |
| 7,936,741 B2 * | 5/2011 | Vimpari et al. | 370/342 |
| 7,940,797 B2 * | 5/2011 | Lee et al. | 370/469 |
| 7,948,936 B2 * | 5/2011 | Lohr et al. | 370/329 |

(Continued)

FOREIGN PATENT DOCUMENTS

| | | |
|---|---|---|
| CN | 2870346 Y | 2/2007 |
| RU | 2137312 C1 | 10/1999 |

(Continued)

OTHER PUBLICATIONS

Cao, Y. et al. "Degree Distribution Based HARQ for Irregular LDPC," Electronics Letters, vol. 42, Issue 6, Mar. 16, 2006, pp. 363-364.*

(Continued)

*Primary Examiner* — Melvin H Pollack
(74) *Attorney, Agent, or Firm* — Condo Roccia Kotpiw LLP

(57) ABSTRACT

Systems, methods, and instrumentalities to provide transmission allocations. A Node-B may receive control information, which may include scheduling information, from a WTRU. The Node-B may determine a non-persistent grant allocation for the WTRU based at least in part on the control information. The non-persistent grant allocation may include a determined grant limit The determined grant limit may be a transmission of a pre-defined number of packet data units.

14 Claims, 4 Drawing Sheets

(56) References Cited

U.S. PATENT DOCUMENTS

| | | | |
|---|---|---|---|
| 7,978,679 B2* | 7/2011 | Chun et al. | 370/349 |
| 8,081,562 B2* | 12/2011 | Charpentier et al. | 370/216 |
| 8,204,449 B2* | 6/2012 | Kwak et al. | 455/69 |
| 8,259,693 B2* | 9/2012 | Lohr et al. | 370/338 |
| 8,274,952 B2* | 9/2012 | Jard et al. | 370/335 |
| 8,320,312 B2* | 11/2012 | Olsson et al. | 370/329 |
| 8,374,621 B2* | 2/2013 | Maheshwari et al. | 455/452.2 |
| 8,401,018 B2 | 3/2013 | Meylan et al. | |
| 8,422,435 B2* | 4/2013 | Hannu et al. | 370/329 |
| 8,432,861 B2* | 4/2013 | Chun et al. | 370/329 |
| 8,432,915 B2* | 4/2013 | Lee et al. | 370/392 |
| 8,542,688 B2* | 9/2013 | Choi et al. | 370/395.42 |
| 8,582,477 B2* | 11/2013 | Usuda et al. | 370/278 |
| 2003/0202563 A1* | 10/2003 | Das et al. | 375/146 |
| 2004/0146301 A1 | 7/2004 | Choi et al. | |
| 2005/0047393 A1 | 3/2005 | Liu | |
| 2005/0091640 A1 | 4/2005 | McCollum et al. | |
| 2005/0157680 A1 | 7/2005 | Zhang et al. | |
| 2006/0092921 A1 | 5/2006 | Narayanan et al. | |
| 2006/0209896 A1 | 9/2006 | Choi et al. | |
| 2007/0042785 A1* | 2/2007 | Nakamata | 455/450 |
| 2007/0049311 A1* | 3/2007 | Lindoff et al. | 455/515 |
| 2007/0140157 A1* | 6/2007 | Fu et al. | 370/318 |
| 2007/0213038 A1* | 9/2007 | Masseroni et al. | 455/414.3 |
| 2008/0188258 A1* | 8/2008 | Usuda et al. | 455/522 |
| 2009/0036139 A1* | 2/2009 | Usuda et al. | 455/450 |
| 2009/0093218 A1* | 4/2009 | Umesh et al. | 455/69 |
| 2009/0135950 A1* | 5/2009 | Hoffmann et al. | 375/298 |
| 2009/0141675 A1* | 6/2009 | Sebire et al. | 370/329 |
| 2009/0154403 A1* | 6/2009 | Niwano | 370/329 |
| 2009/0284434 A1* | 11/2009 | Gothard et al. | 343/834 |
| 2010/0220606 A1* | 9/2010 | Niwano | 370/252 |
| 2011/0103351 A1* | 5/2011 | Wang et al. | 370/335 |
| 2012/0281660 A1* | 11/2012 | Pinheiro et al. | 370/329 |

FOREIGN PATENT DOCUMENTS

| | | |
|---|---|---|
| TW | 200614749 A | 5/2006 |
| TW | 200635391 A | 10/2006 |
| WO | WO 02/097620 A1 | 12/2002 |
| WO | WO 2006/069272 A1 | 6/2006 |
| WO | WO 2006/102949 A1 | 10/2006 |

OTHER PUBLICATIONS

Assi, C. M. et al. "Dynamic Bandwidth Allocation for Quality of Service over Ethernet PONs," IEEE Journal on Selected Areas in Communications, vol. 21, Issue 9, Nov. 2003, pp. 1467-1477.*

Parkvall, S. et al. "WCDMA Enhanced Uplink—Principles and Basic Operation," IEEE 61$^{st}$ Vehicular Technology Conference (VTC), vol. 3; Jun. 1, 2005, pp. 1411-1415.*

Chu, Geosong et al. "A QoS Architecture for the MAC Protocol of IEEE 802.16 BWA System," IEEE International Conference on Communications, Circuits and Systems and West Sino Expositions, vol. 1, Jul. 1, 2002, pp. 435-439.*

Frenger, P. et al. "Performance Comparison of HARQ with Chase Combining and Incremental Redundancy for HSDPA," Fall IEEE VTS 54$^{th}$ Vehicular Technology Conference (VTC), vol. 3, 2001, pp. 1829-1833.*

Wilen, Per. "The RBS 2206—A Flexible Ticket to Third-Generation Wireless Systems," Ericsson Review, No. 2, 2000, pp. 93-94.*

3$^{rd}$ Generation Partnership Project; Technical Specification Group Radio Access Network;FDD Enhanced Uplink; Overall description; Stage 2 (Release 6); 3GPP TS 25.309 V6.6.0 (Mar. 2006).

3$^{rd}$ Generation Partnership Project; Technical Specification Group Radio Access Network; Radio Resource Control (RRC); Protocol Specification (Release 6); 3GPP TS 25.331 V6.12.0 (Dec. 2006).

3$^{rd}$ Generation Partnership Project; Technical Specification Group Radio Access Network; Radio Resource Control (RRC); Protocol Specification (Release 6); 3GPP TS 25.331 V6.15.0 (Sep. 2007).

3$^{rd}$ Generation Partnership Project; Technical Specification Group Radio Access Network; Radio Resource Control (RRC); Protocol Specification (Release 7); 3GPP TS 25.331 V7.3.0 (Dec. 2006).

3$^{rd}$ Generation Partnership Project; Technical Specification Group Radio Access Network; Radio Resource Control (RRC); Protocol Specification (Release 7); 3GPP TS 25.331 V7.6.0 (Sep. 2007).

3$^{rd}$ Generation Partnership Project; Technical Specification Group Radio Access Network; Radio Resource Control (RRC); Protocol Specification (Release 6); 3GPP TS 25.331 V8.0.0 (Sep. 2007).

"Universal Mobile Telecommunications System (UMTS); FDD enhanced uplink; Overall description; Stage 2 (3GPP TS 25.309 version 6.1.0 Release 6)," ETSI TS 125 309 V6.1.0 (Dec. 1, 2004).

QUALCOMM Europe, "Considerations for control signaling support of Real Time Services," 3GPP TSG-RAN WG1 LTE Ad Hoc, R1-060173 (Jan. 23-25, 2006)>.

QUALCOMM Europe, "Scheduling for EUL," 3GPP TSG-RAN1 #38, R1-04-0900 (Aug. 16-20, 2004).

QUALCOMM Europe, "TP on Scheduling of Real Time Services," 3GPP TSG-RAN WG1 #44, R1-060483 (Feb. 13-17, 2006).

Samsung, "EUL Scheduling: signaling support," 3GPP TSG-RAN WG1 Meeting #38bis, R1-041084 (Sep. 20-24, 2004).

3rd Generation Partnership Project (3GPP), R2-060854, "E-UTRA Downlink Control Signaling—Text Proposal", Intel, 3GPP TSG-RAN WG1 #44bis, Mar. 27-31, 2006, 2 pages.

3rd Generation Partnership Project (3GPP), TS 25.321 V7.1.0, "Technical Specification Group Radio Access Network, Medium Access Control (MAC) Protocol Specification (Release 7)", Jun. 2006, 1-94.

* cited by examiner

US 8,824,419 B2

EFFICIENT UPLINK OPERATION WITH HIGH INSTANTANEOUS DATA RATES

CROSS REFERENCE TO RELATED APPLICATION(S)

This application claims the benefit of U.S. Provisional Patent Application No. 60/882,378, filed Dec. 28, 2006, which is incorporated by reference as if fully set forth.

FIELD OF INVENTION

The present invention relates to wireless communication systems.

BACKGROUND

The evolution of high speed packet access (HSPA) towards higher throughput and lower latencies requires improvements to the physical layer as well as possible changes to the architecture. One improvement that has been proposed is the use of higher-order modulations in the downlink (64-QAM) and the uplink (16-QAM) along with enhanced base station receiver capabilities. Another potential improvement is the use of a shorter transmission time interval (TTI). These improvements would be well-suited to the support of delay-sensitive applications with bursty traffic, such as gaming, or to enhance the quality of non-real-time applications such as TCP transfers.

Such evolution has implications on the optimal way of multiplexing users and allocating resources on the UL. For instance, the use of 16-QAM modulation on the UL implies that the chip-level signal-to-interference ratio (Ec/Io) at the base station is well above 0 dB, rather than being below −10 dB as in typical operation with pre-Release 7 (R7) 3GPP systems. This means that fewer wireless transmit receive units (WTRUs) can simultaneously communicate with a base station.

Another consideration is that for a given average data rate, the percentage of time a WTRU has nothing to transmit due to its buffer being empty will increase with increasing instantaneous data rates. Thus, while using high instantaneous data rates improves the user-plane latency, it also means the burstiness of transmissions increases. The signaling mechanisms currently defined for allocating UL resources are not optimized for such bursty operation.

In the UL, the physical and MAC signaling in support of power control and resource allocation is optimized for a scenario where many WTRUs are transmitting simultaneously and at relatively low bit rates. Such signaling will likely not be suitable to take full advantage of the high-data rate capabilities of evolved HSPA, for the following reasons:

First, the power ratio (or equivalently, data rate) allocation to a given WTRU is persistent in the sense that it remains in effect as long as it is not changed by the Node-B through an absolute or relative grant. Such operation is inefficient in a scenario where the burstiness of transmissions is high as will be the case when higher data rates are introduced. This is because the Node-B would constantly have to modify the allocation of each WTRU to avoid overload while efficiently utilizing the resource.

Secondly, the fast closed-loop UL power control that is required up to R6 to maintain the Quality of Service (QoS) of all WTRUs simultaneously transmitting will not be as important in scenarios where a single, or only a few, WTRU is transmitting at a given time, and is adding unnecessary overhead.

Accordingly, better signaling methods are needed to support high UL data rates in evolved HSPA.

SUMMARY

The disclosed method and apparatus for allocating resources comprise scheduling a requesting wireless transmit receive unit (WTRU) for transmission using non-persistent scheduling.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
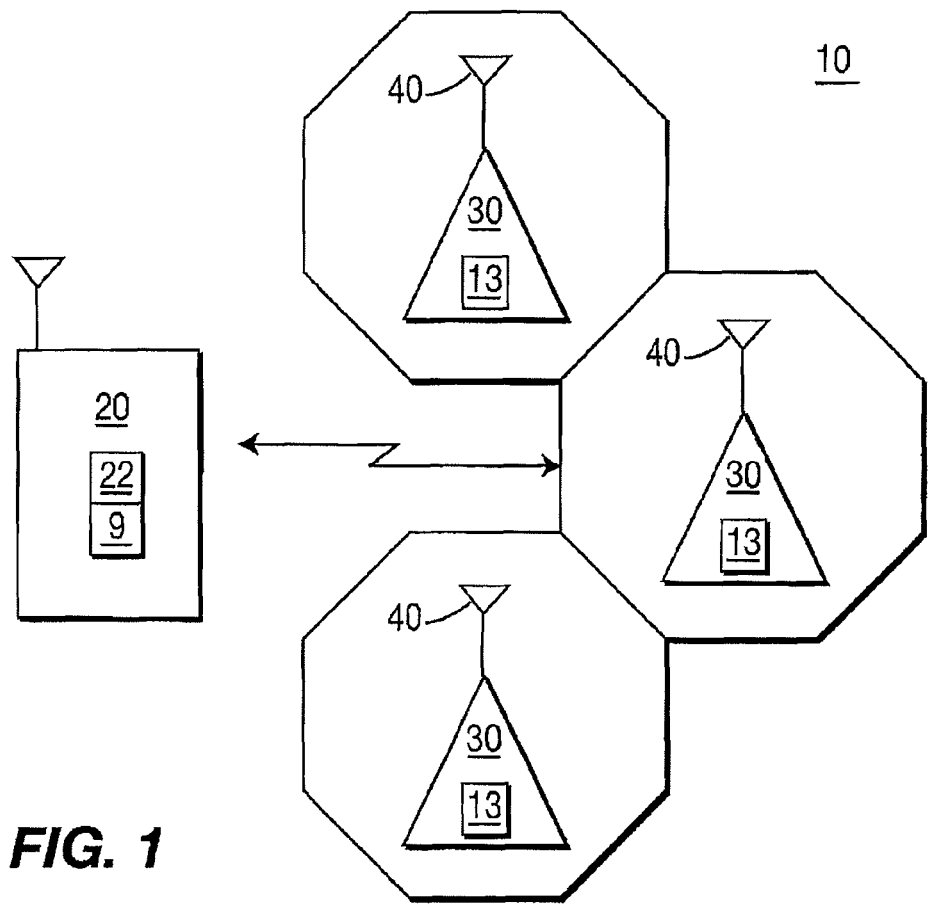
FIG. 1 is a wireless communication network.

FIG. 1 is an example of a wireless communication network (NW) 10 having a plurality of Node-Bs 30 and WTRUs 20, (only one if which is shown). A wireless communication network 10 (NW) comprises at least one WTRU 20, including a transceiver 9 and a processor 22, one or more Node-Bs 30, and one or more cells 40. Each Node-B 30 controls one or more cells 40. Each Node-B 30 includes a transceiver 13 and a processor 33. Processors 22 and 33 are configured to implement the methods disclosed hereafter.

Figure 2:
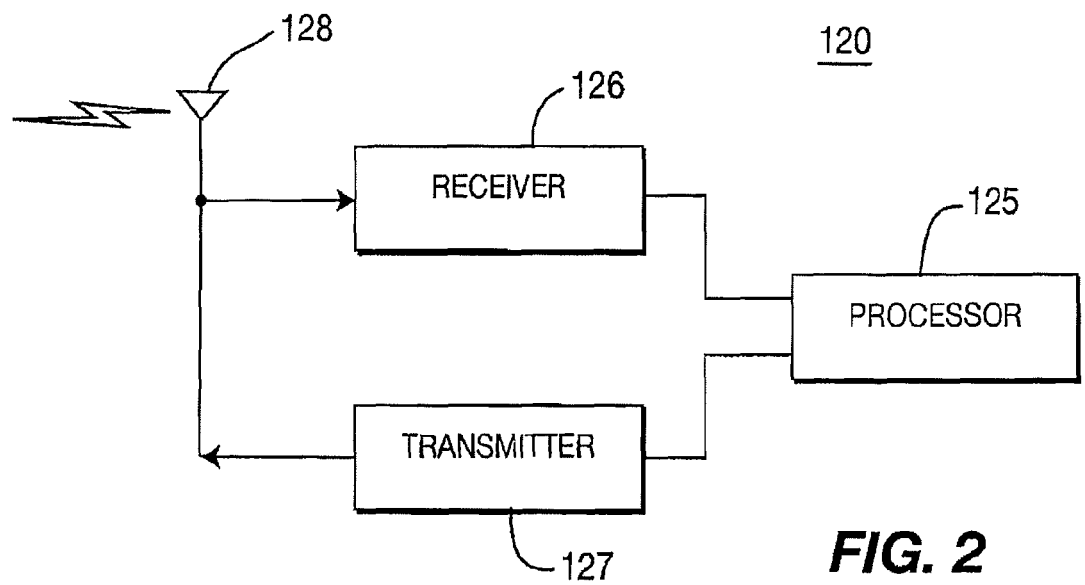
FIG. 2 is a functional block diagram of transceiver.

FIG. 2 is a functional block diagram of transceiver 125 included in Node-B 30. In addition to components included in a typical transceiver, transceiver 120 includes processor 125 configured to perform the methods disclosed below, receiver 126 in communication with processor 125, transmitter 127 in communication with processor 125, and antenna 128 in communication with receiver 126 and transmitter 127 to facilitate the transmission and reception of wireless data. Additionally, the receiver 126, transmitter 127 and antenna 128 may be a single receiver, transmitter and antenna, or may include a plurality of individual receivers, transmitters and antennas, respectively. Transceiver 120 may be located at either the WTRU 20, base station 30, or both.

Figure 3:
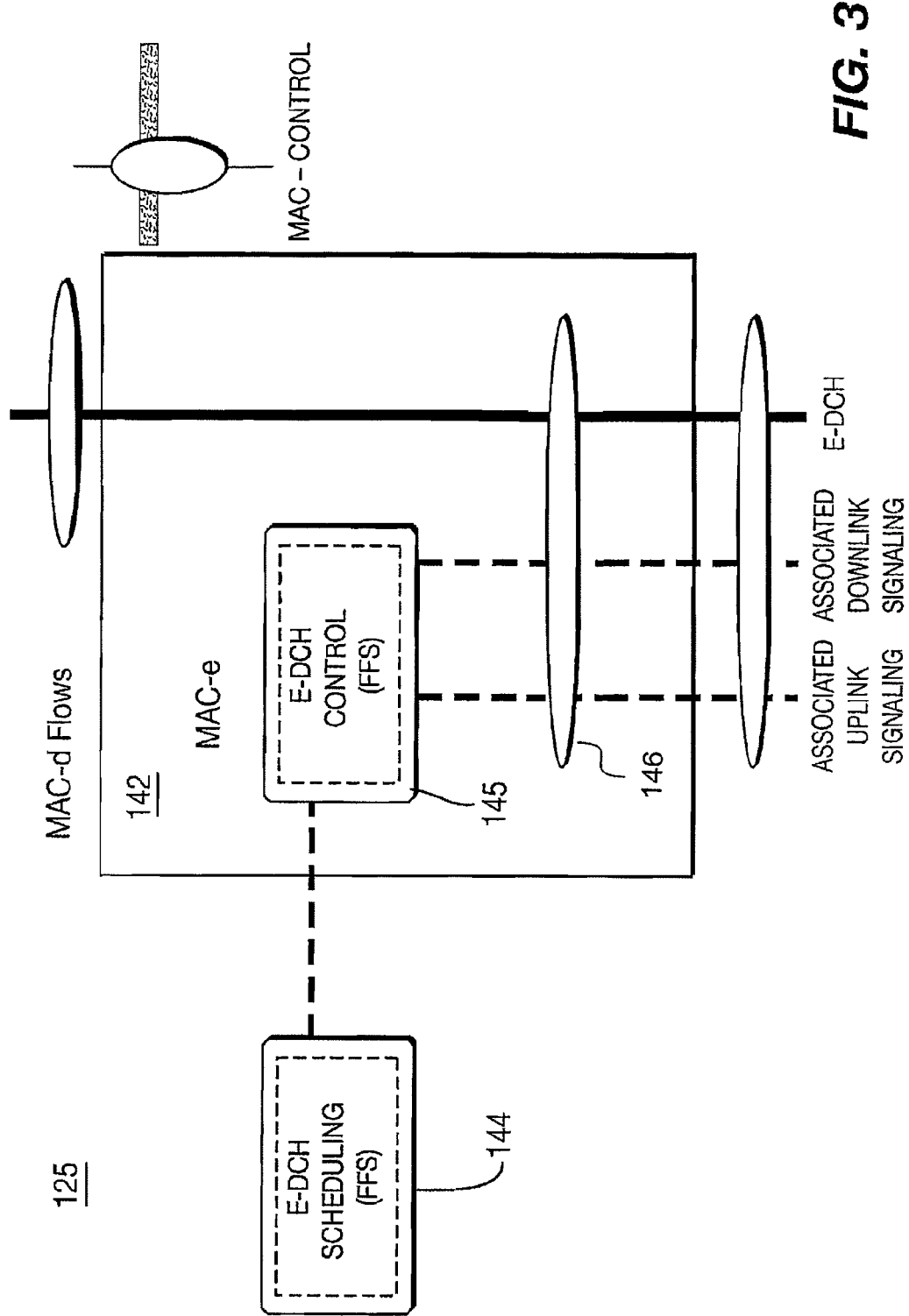
FIG. 3 is a functional block diagram of a disclosed processor configured to implement the disclosed scheduling method.

FIG. 3 is an example block diagram of processor 125. Processor 125 comprises a scheduling processor 142, preferably a MAC-e, for controlling transmissions from WTRUs over an enhanced dedicated channel (E-DCH). Scheduling processor 142 comprises a scheduler 144 for managing E-DCH cell resources between WTRUs, a controller 145 for receiving scheduling requests and transmitting scheduling grants and a hybrid Automatic Repeat Request (HARQ) entity 146, for supporting all tasks required for error control protocol (i.e., HARQ protocol), to be disclosed hereinafter.

In order to accommodate higher order modulation, such as 16-QAM in the uplink, scheduler 144 schedules E-DCH resources using non-persistent scheduling. As such, the transmission opportunity granted by Node-B 30 is valid for a specific WTRU only for a limited duration, or confined to the transmission of a limited number of MAC-e packet data units (PDUs).

Scheduler 144 therefore determines the maximum allowed power ratio for WTRU 20 and a grant limit used to indicate the limitations of the allocation grant. The non-persistent scheduling grant (SG) determined by scheduling processor 142 is provided to controller 145. Controller 145 then transmits the scheduled grant to requesting WTRU 20.

Figure 4:
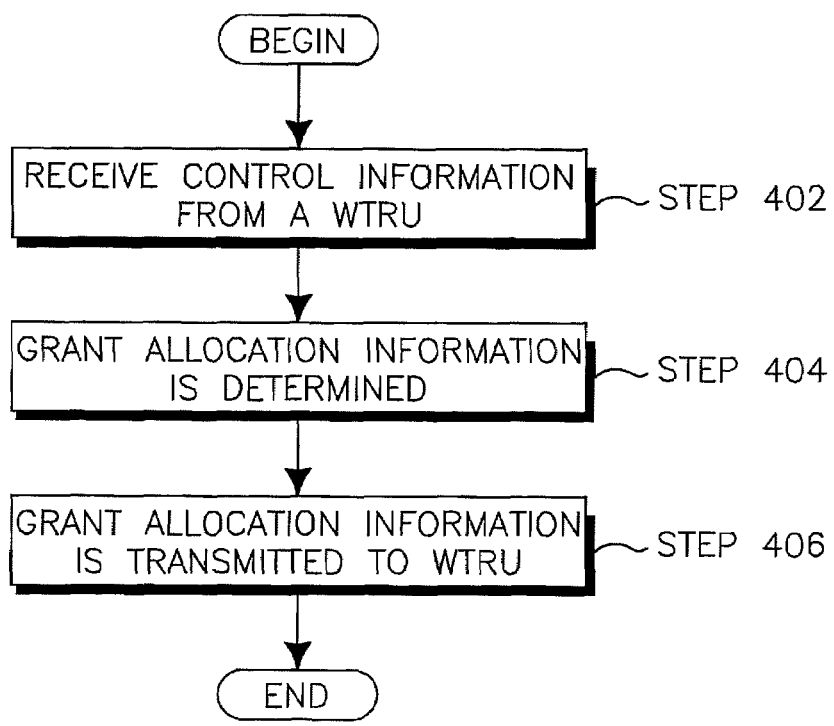
FIG. 4 is a flow diagram of a disclosed scheduling method.

A flow diagram of the method 400 used by processor 125 to grant transmission allocations to a specific WTRU 20 is illustrated in FIG. 4. Node-B 30 receives control information, comprising scheduling information (SI), from WTRU 20 (step 402). Node-B 30, optionally, also receives other information, such as interference generated by other WTRUs and control information transmitted from other WTRUs. Grant allocation information including a grant limit and maximum power ratio for WTRU 20 is determined (step 404). The grant allocation information is then transmitted to WTRU 20, (step 406).

The use of persistent allocations often may require doubling the number of scheduling commands in order to remove the allocation of a WTRU 20, when only a single WTRU 20 is allowed to transmit at given time, and there is a large number of WTRUs 20 connected. Non-persistent scheduling, as disclosed, eliminates the need for this increased scheduling overhead, such that there is sufficient room for transmissions by other WTRUs 20.

In an alternative method, a channel quality indicator (CQI) information is also transmitted to WTRU 20, preferably at the time of scheduling allocation. In accordance with this alternative, a new physical channel may be defined, or a new interpretation of the information bits of an existing channel may be defined.

It is preferable that a new definition for an existing channel be used. For example, the enhanced access grant channel (E-AGCH) encodes six information bits; five for the grant value and one for the scope. Since Node-B 30 does not signal a power ratio, the grant value is now meaningless. Therefore, the five bits of the E-AGCH can be replaced to encode the CQI information, (32 values in this case). The remaining bit of the E-AGCH could be used to signal whether persistent allocation or non-persistent allocation is used. In accordance with this alternative, a non-persistent allocation may be valid for a pre-defined number of MAC-e PDUs, as disclosed above, on the same HARQ process, preferably, conducted by HARQ entity 146. Alternatively, more bits could be reserved in the modified E-AGCH to signal how many MAC-e PDUs the allocation is valid for using non-persistent allocation. In still another alternative, the non-persistent allocation could be valid for a predetermined time duration, which may be signaled from higher layers.

Figure 5:
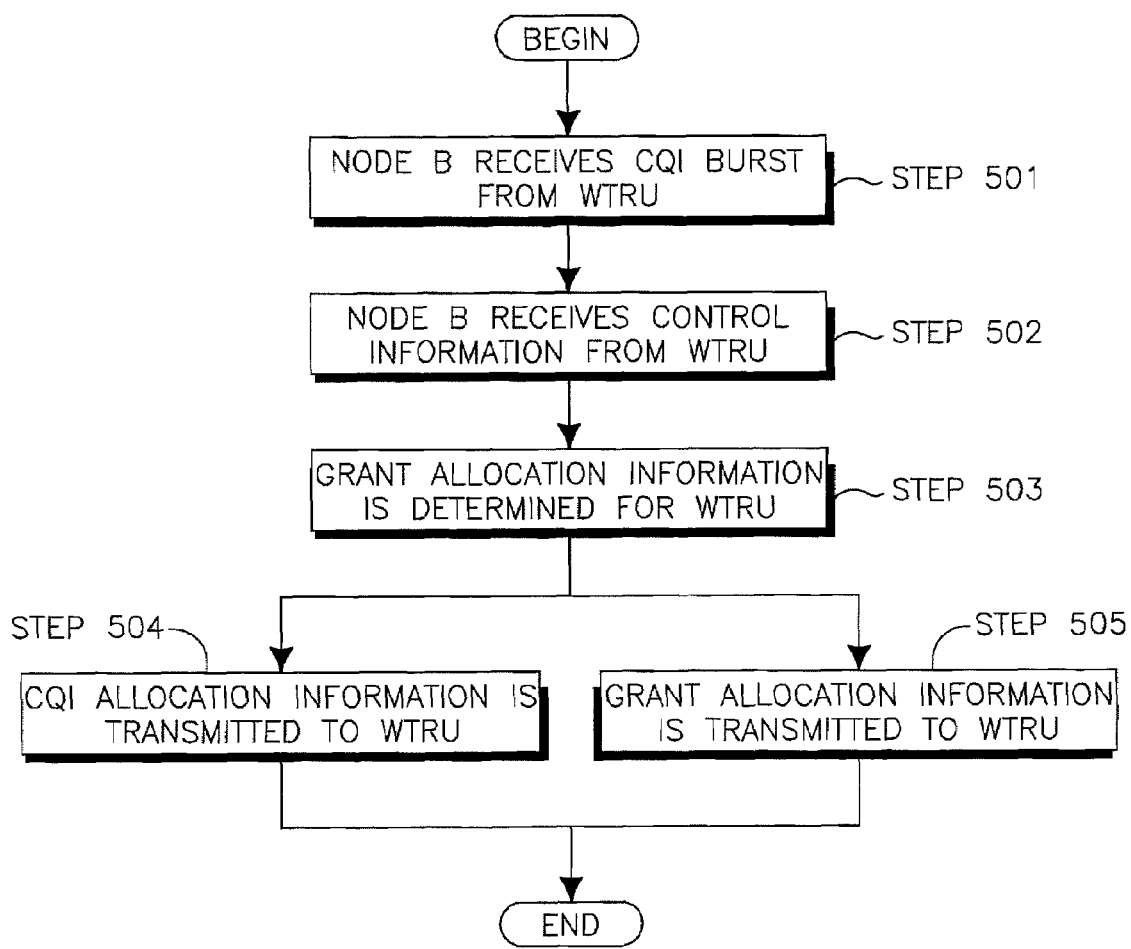
FIG. 5 is a flow diagram of a disclosed scheduling method using channel quality indicator signaling.

In order for Node-B 30 to determine when to schedule WTRU 20 and the appropriate CQI, a signal (preferably a CQI burst) is transmitted from WTRU 20 shortly before transmitting the control information used for scheduling. An example signal may be a previous data transmission from WTRU 20. A flow diagram of the method 500 used by processor 125 to grant transmission allocations, including a CQI information, is illustrated in FIG. 5. Node B 30 receives a CQI burst (step 501) and control information from WTRU 20 (step 502). Grant allocation information including a grant limit is determined for WTRU 20 (step 503). The CQI and grant allocation information are then transmitted to WTRU 20 (steps 504 and 505, respectively). Although the CQI and grant allocation have been disclosed as being transmitted at the same time by Node B 30, it should be appreciated by those having skill in the art that the CQI may be transmitted before or after the grant allocation.

Alternatively, if WTRU 20 has not transmitted data (or CQI reports) for a long time, WTRU 20 may transmit a special signal. This signal is preferably transmitted at a defined power offset from the power level used by WTRU 20 to transmit data. The power offset may be signaled to WTRU 20 beforehand (through e.g., radio resource control (RRC) signaling). The signal may include information on the amount of data buffered in WTRU 20, which may be encoded at the physical or MAC layer. This alternative does not require a new format different from the existing Scheduling Information. Additionally, the signal could be used to support slow power control if a closed-loop scheme is employed, to be disclosed hereinafter.

Alternatively, Node-B 30 may schedule WTRU 20 without such a transmission, biasing a CQI on previously available measurements. In accordance with this alternative, such a CQI is preferably biased according to a pre-defined rule in Node-B 30. For example, the type of biasing may depend on a specific goal Node-B 30 is trying to achieve. If Node-B 30 is trying to minimize interference from WTRU 20, the initial CQI is preferably biased down. If Node-B 30 is trying to maximize the probability of detection of data from WTRU 20 on the first try, the CQI is preferably biased up.

If the initial transmission from WTRU 20 results in error, the erroneous transmission is used to measure CQI for the re-transmission. In this alternative, the CQI is then preferably forwarded together with ACK/NACK, using HARQ entity 146. As those having skill in the art recognize, HARQ entity 146 is responsible for generating acknowledgement (ACKs) or non-acknowledgements (NACKs), which indicate the delivery status of a single MAC-e PDU to WTRU 20. This can be done either by defining a new downlink (DL) signaling, or re-defining the meaning of the E-RGCH channel. In the latter case, the CQI change signaled is preferably a delta up or a delta down for the next transmission.

In accordance with this method, the methods of determining the CQI are set forth in TABLE I below:

TABLE I

| Information received from WTRU | Method of determining CQI |
| --- | --- |
| CQI burst | Determines CQI using received transmission |
| Special signal transmitted at a defined power offset | Determines CQI using the received special signal |
| No information | CQI biased based on a specific goal |
| Erroneous transmission | CQI based on erroneous transmission and sent to WTRU along with ACK/NACK. |

In the CELL_FACH mode, the CQI burst as set forth above is modified to enable similar operation of Random Access over HSUPA-type signaling with fast allocation. For example, an access-preamble with ramp up similar to currently used random access channel (RACH) schemes may be used. The access codes and slots are defined in a manner similar to what is done in present day schemes and the signatures selected correspond to a temporary "user ID" (which exists only at the Physical (PHY) and MAC layers). As such, when Node-B 30 acquires a particular RACH preamble from WTRU 20 HARQ entity 146 determines whether a NACK response, which will tell WTRU 20 not to transmit, or an ACK response with a specific CQI, which will enable WTRU 20 to select the appropriate transport format for message transmission should be transmitted to WTRU 20. In accordance with this method, a NACK can be seen as a special case of CQI (i.e., CQI of zero, per se). This CQI/ACK/NACK is addressed to WTRU 20 with the temporary ID based on the detected signature, thus identifying the correct WTRU 20. This ID is valid for the duration of one MAC transport block, and can therefore be used to send CQI/ACK/NACK's to that WTRU 20 for re-transmission.

In accordance with the disclosed method using CQI signaling, from the Node-B, adaptive modulation and coding on the uplink is enabled. Instead of compensating for channel variations with transmission power to regulate the received power at the Node-B 30, the received power is preferably allowed to vary, while the modulation and coding scheme that matches the current channel conditions is utilized.

Slow power control with CQI signaling can be realized by any of the methods disclosed above. These methods include closed loop RRC signaling, which includes the Node B RNC sending RRC messages to the WTRU Radio Network Controller (RNC) to control its transmission power when transmitting data, based on interference measurement reports, e.g., CQI reports, from the Node-B; re-interpreting E-DCH relative grant channel (E-RGCH) as a "power-up/down" command (instead of power-ratio-up/down), which assists with inter-cell interference; and continuing to use a fractional dedicated channel (F-DPCH) with a frequency, predetermined by higher layer signaling, that is lower than current methods.

The rationale for utilizing slow power control (instead of fast power control) is that there is little gain in tightly controlling interference at serving Node-B 30, since scheduler 144 in Node-B 30 has the possibility of scheduling one WTRU 20 at a time. Furthermore, interference to other Node-Bs is typically not improved by fast power control since the fast power control commands are correlated to the channel of the closest Node-B, which most of the time is serving Node-B 30.

Another advantage of slow power control is that Node-B 30 has the possibility of optimizing the choice of which WTRU 20 should be transmitting at a given time, depending on short-term channel conditions (channel-sensitive scheduling). Furthermore, the enhanced transmission format code (E-TFC) selection procedure is considerably simplified since WTRU 20 knows directly from Node-B 30 what E-TFC it can use. Therefore, the transmission power does not need to be recalculated at every transmission.

A backward-compatible implementation in high speed packet access (HSPA) systems minimizes the changes to the existing control channel structure. Legacy WTRUs that do not implement the disclosed method may still operate in accordance with the existing procedures and listen to the same physical channels defined in current systems (i.e., Release 6 systems). The modified E-AGCH used to support the WTRUs that utilize the disclosed method are identified with the E-DCH radio network temporary identity (E-RNTI), therefore the changes to past systems are transparent to legacy WTRUs. The modified E-RGCH, if used, is also transparent to legacy WTRUs since it uses different signature sequences for different WTRUs.

Although the full performance benefits of the disclosed method are available in scenarios where all WTRUs on the carrier implement the invention, it is still possible to get benefits even if a fraction of WTRUs are legacy WTRUs or WTRUs transmitting more continuously at lower bit rates. In this case, different radio resource management methods are possible for the coexistence of these two types of WTRUs. Once disclosed method segregates the high bit rate WTRUs and the low bit rate (and legacy) WTRUs in time, thereby restricting the allowed HARQ processes of the WTRUs. Another disclosed method reserves a fraction of the total UL load for the low bit rates and legacy WTRUs, and limits the UL load used up by high bit rate WTRUs that use the slow power control mechanism.

The above disclosed methods are applicable to WTRUs in the Cell_Dch and Cell_FACH states. These methods have the advantage of reducing overhead and possibly allowing the serving Node-B to perform channel-sensitive scheduling; simplification of the E-TFC selection procedure (since the WTRU directly knows which E-TFC is achievable from the CQI transmitted by the Node-B); and reducing overhead due to E-DCH downlink control channels (e.g., E-AGCH, E-RGCH).

Although the features and elements are described in particular combinations, each feature or element can be used alone without the other features and elements or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for scheduling transmission allocations comprising:
   a wireless transmit receive unit (WTRU) sending control information; and
   receiving a non-persistent grant allocation, wherein the non-persistent grant allocation includes a determined grant limit, and wherein the determined grant limit is a transmission of a pre-defined number of MAC-e packet data units.

2. The method of claim 1, wherein the control information comprises scheduling information.

3. A wireless transmit receive unit (WTRU) comprising:
a transmitter configured to send control information; and
a processor configured to receive a non-persistent grant allocation, wherein said non-persistent grant allocation includes a determined grant limit, and wherein said determined grant limit is a transmission of a pre-defined number of MAC-e packet data units.

4. The WTRU of claim 3, wherein the control information comprises scheduling information.

5. The method of claim 1, wherein the pre-defined number of MAC-e packet data units are on a same HARQ process conducted by a HARQ entity.

6. The method of claim 1, further comprising sending a signal comprising information on an amount of data buffered in the WTRU.

7. The method of claim 6, wherein the signal is sent at a defined power offset.

8. The method of claim 1, wherein the non-persistent grant allocation is received via an enhanced access grant channel (E-AGCH), wherein one or more bits signaled on the E-AGCH indicate the pre-defined number of MAC-e packet data units.

9. The method of claim 1, wherein the non-persistent grant allocation is received via an enhanced access grant channel (E-AGCH), wherein a bit signaled on the E-AGCH indicates that a grant allocation is persistent or non-persistent.

10. The WTRU of claim 3, wherein the pre-defined number of MAC-e packet data units are on a same HARQ process conducted by a HARQ entity.

11. The WTRU of claim 3, wherein the processor is further configured to send a signal comprising information on an amount of data buffered in the WTRU.

12. The WTRU of claim 11, wherein the signal is sent at a defined power offset.

13. The WTRU of claim 3, wherein the non-persistent grant allocation is received via an enhanced access grant channel (E-AGCH), wherein one or more bits signaled on the E-AGCH indicate the pre-defined number of MAC-e packet data units.

14. The WTRU of claim 3, wherein the non-persistent grant allocation is received via an enhanced access grant channel (E-AGCH), wherein a bit signaled on the E-AGCH indicates that a grant allocation is persistent or non-persistent.

* * * * *